United States Patent [19]
Rashbrook

[11] 3,935,168
[45] Jan. 27, 1976

[54] PROCESS FOR PREPARING POLYESTERS FROM TEREPHTHALIC ACID IN THE PRESENCE OF PHOSPHONIUM COMPOUNDS

[75] Inventor: Robert Benson Rashbrook, Harrogate, England

[73] Assignee: Imperial Chemical Industries Limited, London, England

[22] Filed: Dec. 12, 1973

[21] Appl. No.: 424,011

Related U.S. Application Data
[63] Continuation of Ser. No. 203,858, Dec. 1, 1971, abandoned.

[52] U.S. Cl.............................. 260/75 P; 260/75 R
[51] Int. Cl.²........................................ C08G 63/38
[58] Field of Search.......................... 260/75 P, 75 R

[56] References Cited
UNITED STATES PATENTS
3,427,287  2/1969  Pengilly ................................ 260/75

FOREIGN PATENTS OR APPLICATIONS
10,622    1967    Japan ............................... 260/75 P

OTHER PUBLICATIONS

Polyethylene Terephthalate, Shimizu et al., CA. Vol. 67, p. 64871, (a), 1967.

*Primary Examiner*—Lester L. Lee
*Attorney, Agent, or Firm*—Robert J. Blanke

[57] ABSTRACT

Preparation of fibre-or film-forming polyester or co-polyester wherein terephthalic acid or mixture with a second dicarboxylic acid is reacted with glycol and polycondensed with a phosphonium compound having at least one aryl constituent.

4 Claims, No Drawings

PROCESS FOR PREPARING POLYESTERS FROM TEREPHTHALIC ACID IN THE PRESENCE OF PHOSPHONIUM COMPOUNDS

This a continuation of application Ser. No. 203,858, filed Dec. 1,1971, and now abandoned.

The present invention, which is a continuation-in-part application of copending application Ser. No. 706,689, filed Feb. 19,1968, relates to the preparation of polyesters by the reaction of dicarboxylic acids with glycols and polycondensation of the derived ester to give a high molecular weight fibre of film-forming polyester.

According to our invention we provide a process for the preparation of a fibre or film-forming polyester or copolyester wherein terephthalic acid or a mixture of terephthalic acid with from 5 to 25 molecules per 100 of a second dicarboxylic acid is reacted with at least one glycol at elevated temperature and the resultant ester or mixture of esters is polycondensed under known conditions until a high molecular weight polyester or copolyester is formed, characterised in that during the reaction there is present a compound or the carbonate, bicarbonate or 1 to 6 carbon aliphatic monocarboxylic acid salt of a compound, of the formula:

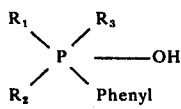

where each of the groups $R_1$, $R_2$ and $R_3$ is alkyl or aryl, in amount not less than 0.001 percent by weight based on the terephthalic acid and not greater than about 0.5 percent by weight based on the terephthalic acid. While tetra alkyl phosphonium compounds are known to increase the softening temperature of poly(ethylene terephthalate) (Japanese Patent No. 10622), these compounds are surprisingly not as effective as phosphonium compounds containing at least one phenyl group.

In order that the derived polyesters should have the desired fibre or film-forming properties, at least 80 percent of the units making up the polyester should be terephthalate units.

Examples of suitable glycols for use in the process of our invention are those of the formula $HO(CH_2)_nOH$, where $n$ is greater than one and not greater than 10, and 1:4-hydroxymethyl cyclohexane. The quantity of glycol or glycols to be used as related to the quantity of terephthalic acid or terephthalic acid plus second dicarboxylic acid is in accordance with existing knowledge and should be at least greater than the equimilocular amount.

Examples of suitable second dicarboxylic acids to be used in the preparation of copolyesters are isophthalic acid and sebacic acid.

Examples of suitable phosphonium compounds of the Formula

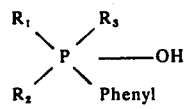

are $(Ph)_3CH_3P.OH$, $(Ph)_3C_2H_5P.OH$, $Ph_4POH$, $Ph_3(isopropyl)POH$ and $Ph_3(C_4H_9)POH$.

An advantage of the process of our invention is that by the use of it copolyesters may be prepared which have softening points higher than would be obtained in the absence of the described phosphorus compound. The production of a copolyester of a relatively high softening point is an indication of the minimal formation of undesirable byproducts during the reaction.

A further advantage of the process of our invention is that by the use of it, copolyesters may be produced in successive batches or continuously with minimum variation in the softening point from batch to batch or with time respectively.

The polycondensation stage may be catalysed by known polycondensation catalysts. Particularly advantageous for this purpose are soluble antimony compounds and germanium compounds; such catalysts may be present during the reaction of the dicarboxylic acid with the glycol.

In order that the process of our invention may be the more fully understood, we give hereinafter some examples of methods in which it may be put into practice.

EXAMPLE 1

Terephthalic acid (996 parts by weight), ethylene glycol (774 parts by weight), antimony trioxide (0.4 parts by weight), titanium dioxide (5 parts by weight) and methyl triphenyl phosphonium hydroxide (0.35 parts by weight) are heated together to a temperature of 232°C and maintained thereat for 1 hour and 55 minutes at the end of which time no undissolved terephthalic acid is found to remain at the reaction temperature. The temperature of the reaction mixture is then raised to 265°C and reaction continued under a pressure of 0.2 mm. of mercury. The degree of polycondensation is interpolated from the power required to drive the agitator and is judged to have reached the desired stage after 3 hours at 265°C. The Viscosity Ratio of the derived polyester, as measured on a 1% solution in orthochlorophenol at 25°C, is found to be 1.718; and its softening point is found to be 259.7°C.

EXAMPLE 2

The procedure is exactly the same in all particulars as in Example 1 with the exception that for 0.35 parts by weight of methyl triphenyl phosphonium hydroxide are substituted 0.50 parts by weight of methyl triphenyl phosphonium hydroxide. The polycondensation is judged to be complete after 2 hours 30 minutes. The Viscosity Ratio of the derived polyester measured as described in Example 1, is found to be 1.775; and the softening point is found to be 259.1°C.

EXAMPLE 3

The procedure is exactly the same in all particulars as in Example 1 with the exception that no methyl triphenyl phosphonium hydroxide is present in the reaction mixture. The polycondesnation is judged to be complete after 2 hours 18 minutes. The Viscosity Ratio of the drived polyester, measured as described in Example 1, is found to be 1.760; and the softening point is found to be 256.9°C.

EXAMPLE 4

The process of Example 1 is repeated except that in place of the 996 parts of the terephthalic acid, 49.8 parts of isophthalic acid and 946.2 parts of terephthalic acid are employed. The softening point of the resultant copolymer is found to be increased over that of a similar copolyester which does not contain methyl triphenyl phosphonium hydroxide.

EXAMPLE 5

The process of Example 1 is repeated except that in place of the 996 parts of terephthalic acid, 60.7 parts of sebasic acid and 946.2 parts of terephthalic acid are employed. The softening point of the resultant copolymer is found to be increased over that of a similar copolyester which does not contain methyl triphenyl phosphonium hydroxide.

EXAMPLES 6–14

Terephthalic acid (1382 parts by weight) and ethylene glycol (956 parts by weight) are reacted employing the conditions as set forth in the following table.

Phosphonium compound as set forth in the table is heated together with the terephthalic acid and ethylene glycol to the esterification temperature as indicated in the table, and maintained for that time given in column 4 of the table. At the end of the esterification reaction time, no undissolved terephthalic acid is found to remain at the reaction temperature. 0.07% by weight based on the polyester and 0.5% by weight based on the weight of the polyester of titanium dioxide is then added. The reaction temperature is then raised as indicated in column 6 of the table, and the reaction continued at a pressure of 0.2 millimeters of mercury. The degree of polycondensation is interpolated from the power required to drive an agitator and is judged to have reached the desired stage after the time indicated in column 7 of the table.

ester or mixture of esters is polycondensed in the presence of a polycondensation catalyst selected from the group consisting of soluble antimony compounds and soluble germanium compounds, at temperatures above said elevated temperature until a high molecular weight polyester or copolyester is formed, characterized in that during the reaction there is present a compound of the formula:

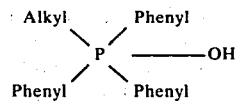

in amount not less than 0.001 percent by weight based on the terephthalic acid and not greater than about 0.5 percent by weight based on the terephthalic acid.

2. A process for the preparation of fiber or film forming polyester from terephthalic acid and a glycol selected from the group consisting of $HO(CH_2)_nOH$ where n is greater than 1 and not greater than 10 and 1:4-hydroxymethylcyclohexane, comprising conducting the esterification and polycondensation reactions in the presence of from 5 to 25 molecules per 100 molecules of terephthalic acid of a second dicarboxylic acid selected from the group consisting of isophthalic acid and sebacic acid and a compound of the formula:

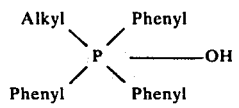

TABLE

| Column 1 | Column 2 Phosphonium Compound | Column 3 Quantity of Phosphonium Compound % | Column 4 Esterification Time, Number | Column 5 Esterification Temperature °C | Column 6 Polycondensation Temperature °C | Column 7 Polycondensation time minutes | Column 8 I.V. | Column 9 Softening Point |
|---|---|---|---|---|---|---|---|---|
| Example 6 | $(C_2H_5)_4P.OH$ | .021 | 140 | 240 | 295 | 75 | 0.692 | 250.6 |
| Example 7 | $(C_2H_5)_4P.OH$ | .060 | 103 | 235 | 295 | 43 | 0.677 | 251.9 |
| Example 8 | $(HO.C_2H_4)_4P.OH$ | .0285 | 162 | 240 | 290 | 88 | 0.688 | 246.5 |
| Example 9 | $Ph_3CH_3P.OH$ | .0335 | 150 | 240 | 295 | 61 | 0.688 | 255.6 |
| Example 10 | $Ph_4P.OH$ | .0411 | 165 | 240 | 295 | 50 | 0.668 | 255.6 |
| Example 11 | $Ph_3C_2H_5P.OH$ | .0385 | 175 | 240 | 290 | 75 | 0.703 | 256.0 |
| Example 12 | $Ph_3(isopropyl)P.OH$ | .0403 | 153 | 235 | 290 | 76 | 0.658 | 255.9 |
| Example 13 | $Ph_3.Bu.P.OH$ | .042 | 145 | 235 | 290 | 59 | 0.665 | 256.9 |
| Example 14 | None | 0 | 136 | 235 | 295 | 112 | — | 248.9 |

I.V. intrinsic viscosity (1% solution in orthochlorophenol at 25°C)

As can be seen from the table, the aromatic phosphonium compounds are clearly superior to aliphatic phosphonium compounds for purposes of raising the softening point of polyester.

Having thus disclosed the invention, what is claimed is:

1. A process for the preparation of a fiber or film forming polyester or copolyester wherein terephthalic acid or a mixture of terephthalic acid with up to 25 molecules per 100 molecules of a second dicarboxylic acid is reacted with at least one glycol selected from the group consisting of $HO(CH_2)_nOH$ where n is greater than 1 and not greater than 10 and 1:4-hydroxymethylcyclohexane at elevated temperature and the resultant in amounts not less than 0.001 percent by weight based on the terephthalic acid and not greater than about 0.5 percent by weight based on the terephthalic acid, said esterification being conducted at elevated temperature and said polycondensation being conducted in the presence of a polycondensation catalyst selected from the group consisting of soluble antimony compounds and soluble germanium compounds at temperatures above said elevated temperature.

3. A process according to claim 1 wherein said glycol is ethylene glycol.

4. A process according to claim 2 wherein said glycol is ethylene glycol.

* * * * *